United States Patent [19]

Marcelais et al.

[11] Patent Number: 6,110,227
[45] Date of Patent: Aug. 29, 2000

[54] SYSTEMS AND METHODS FOR PRE-PROCESSING VARIABLE INITIALIZERS

[75] Inventors: Michael Ronn Marcelais, Redmond; James E. Walsh, Kirkland, both of Wash.

[73] Assignee: Microsoft Corporation, Redmond, Wash.

[21] Appl. No.: 09/103,862

[22] Filed: Jun. 24, 1998

[51] Int. Cl.[7] ........................................... G06F 9/45
[52] U.S. Cl. ........................................ 717/10; 717/5
[58] Field of Search .......................... 395/704, 705–709, 395/710; 717/4, 5, 6, 7, 8, 9, 10

[56] References Cited

U.S. PATENT DOCUMENTS

| | | | |
|---|---|---|---|
| 5,293,629 | 3/1994 | Conley et al. | 395/708 |
| 5,339,419 | 8/1994 | Chan et al. | 395/707 |
| 5,375,241 | 12/1994 | Walsh | 709/305 |
| 5,535,329 | 7/1996 | Hastings | 714/35 |
| 5,555,417 | 9/1996 | Odnert et al. | 395/707 |
| 5,579,469 | 11/1996 | Pike | 345/326 |
| 5,581,696 | 12/1996 | Kolawa et al. | 714/38 |
| 5,584,027 | 12/1996 | Smith | 395/707 |
| 5,613,063 | 3/1997 | Eustace et al. | 714/38 |
| 5,613,117 | 3/1997 | Davidson et al. | 395/708 |
| 5,675,803 | 10/1997 | Preisler et al. | 395/704 |
| 5,802,368 | 9/1998 | Grigsby et al. | 709/305 |
| 5,835,701 | 11/1998 | Hastings | 714/35 |
| 5,838,979 | 11/1998 | Hart et al. | 395/707 |
| 5,854,924 | 12/1998 | Rickel et al. | 395/704 |
| 5,884,083 | 3/1999 | Royce et al. | 395/705 |
| 5,901,308 | 5/1999 | Cohn et al. | 712/244 |
| 5,956,512 | 9/1999 | Simmons et al. | 395/705 |
| 5,978,583 | 11/1999 | Ekanadham et al. | 395/703 |

OTHER PUBLICATIONS

Jain et al., "Efficient Symbolic Sim,ulation–based verification using the parametric form of boolean expressions", IEEE Transactions on Computer Aided Design, Aug. 1994, pp 1005–1015.

Russell et al., "Shifting Register Windows", IEEE Micro, 1993, pp 28–35.

Primary Examiner—Kakali Chaki
Attorney, Agent, or Firm—Jones & Askew, LLP

[57] ABSTRACT

Systems and methods for pre-processing an initializer prior to creation of a final version of a binary image and excluding the initializer from the computer code that comprises the binary image. Prior to creation of the final version of the binary image, an attempt is made to pre-process the initializer as if it were being processed during execution of the binary image. The initializer may be pre-processed during one or more of three stages involved in the creation of a binary image: prior to operation of the linker; during operation of the linker; and after operation of the linker. If the initializer is successfully pre-processed, an initialized value for a variable is determined. This initialized value is written into the binary image and all references and calls to the initializer are excluded from the binary image. Thus, during all subsequent start-ups of the binary image, no initialization of the variable will be performed.

18 Claims, 14 Drawing Sheets

500

504

```
extern int extVal;
extern int square(int val);

int dataVal = 42;
int addrVal = (int)&dataVal;

int complexVal = square(16);
int probVal = 7 + extVal;

int square(int val)
{
        return(val*val);
}
```

| Symbol Number | Address | Section | Symbol Type | Entry Type | Name | Extra Records | | |
|---|---|---|---|---|---|---|---|---|
| 000 | 00000015 | DEBUG | notype () | Filename | .file | sample.cpp | | |
| 002 | 00000000 | SECT1 | notype () | Static | .drectve | Section length 26 | #relocs 0 | #linenums 0 |
| 004 | 00000000 | SECT2 | notype () | Static | .debug$S | Section Length 20B | #relocs 18 | #linenums 0 |
| 006 | 00000000 | SECT3 | notype () | Static | .CRT$XCU | Section length 8 | #relocs 2 | #linenums 0 |
| 008 | 00000000 | SECT3 | notype () | Static | _$S6$S186 | | | |
| 009 | 00000000 | SECT3 | notype () | Static | _$S3$S180 | | | |
| 00A | 00000000 | SECT4 | notype () | Static | .data | Section length 8 | #relocs 1 | #linenums 0 |
| 00C | 00000000 | SECT4 | notype () | External | ?addrVal@@3HA (int addrVal) | | | |
| 00D | 00000000 | SECT4 | notype () | External | ?dataVal@@3HA (int addrVal) | | | |
| 00E | 00000000 | SECT5 | notype () | Static | .bss | Section length 8 | #relocs 0 | #linenums 0 |
| 010 | 00000004 | SECT5 | notype () | External | ?complexVal@@3HA (int complexVal) | | | |
| 011 | 00000000 | SECT5 | notype | External | ?probVal@@3HA (int probVal) | | | |
| 012 | 00000000 | SECT6 | notype () | Static | .text | Section length 46 | #relocs 6 | #linenums 5 |
| 014 | 00000000 | SECT6 | notype () | Static | $E2 | | | |
| 015 | 00000000 | DEBUG | notype () | Filename | .file | sample.cpp | | |
| 017 | 0000000A | SECT6 | notype () | Static | $E1 | tag index 00000019 | lines 0000004fD | |
| 019 | 0000000A | SECT6 | notype () | BeginFunction | .bf | line# 0006 | size 00000014 | |
| 01B | 00000001 | SECT6 | notype () | .bf or .ef | .lf | line# 0006 | end 00000022 | |
| 01C | 0000001E | SECT6 | notype () | EndFunction | .ef | | | |
| 01E | 0000001E | SECT6 | notype () | Static | $E5 | | | |
| 01F | 00000028 | SECT6 | notype () | Static | $E4 | tag index 00000022 | size 00000012 | lines 00000503 |
| 021 | 00000000 | UNDEF | notype () | External | ?extVal@@3HA (int extVal) | | | |
| 022 | 00000000 | SECT6 | notype () | BeginFunction | .bf | line# 0007 | size 00000029 | next function 00000027 |
| 024 | 00000001 | SECT6 | notype () | .bf or .ef | .lf | line# 0007 | end 00000029 | |
| 025 | 0000003A | SECT6 | notype () | EndFunction | .ef | | | |
| 027 | 0000003A | SECT6 | notype() | External | ?square@@YAHH@Z (int _cdeclsquare(int)) | tag index 00000029 | size 0000000C | lines 00000509 |
| 029 | 0000003A | SECT6 | notype () | BeginFunction | .bf | line# 000a | | next function 00000000 |
| 02B | 00000003 | SECT6 | notype () | .bf or .ef | .lf | line# 000a | | |
| 02C | 00000046 | SECT6 | notype () | EndFunction | .ef | line# 000c | | |
| 02E | 00000000 | SECT7 | notype () | Static | .debug$T | Section length 24 | #relocs 0 | #linenums 0 |

```
_$E4:
  00000028: 55              push  ebp
  00000029: 8B EC           mov   ebp,esp
  0000002B: A1 00 00 00 00  mov   eax,[00000000]
  00000030: 83 C0 07        add   eax,7
  00000033: A3 00 00 00 00  mov   [00000000],eax
  00000038: 5D              pop   ebp           ← 809
  00000039: C3              ret
?square@@YAHH@Z (int __cdecl square(int)):
  0000003A: 55              push  ebp           ←——————— 817
  0000003B: 8B EC           mov   ebp, esp      ←——————— 818
  0000003D: 8B 45 08        mov   eax, dword ptr [ebp+8]  ←——— 819
  00000040: 0F AF 45 08     imul  eax,dword ptr [ebp+8]   ←——— 820
  00000044: 5D              pop   ebp           ←——————— 821
  00000045: C3              ret                 ←——————— 822

RAW DATA #6
00000000  55 8B EC E8 00 00 00 00 | 5D C3 55 8B EC 6A 10 E8
00000010  00 00 00 00 83 C4 04 A3 | 00 00 00 00 5D C3 55 8B
00000020  EC E8 00 00 00 00 5D C3 | 55 8B EC A1 00 00 00 00
00000030  83 C0 07 A3 00 00 00 00 | 5D C3 55 8B EC 8B 45 08       806
00000040  0F AF 45 08 5D C3

RELOCATIONS #6
                Symbol       Symbol    Symbol
  Offset   Type Applied To   Index     Name
807 -----------
  00000004 REL32 00000000    17        _$E1
  00000010 REL32 00000000    27        square@@YAHH@Z (int _cdecl square(int))
808 00000018 DIR32 00000000  10        ?complexVal@@3HA (int complexVal)
  00000022 REL32 00000000    1F        _$E4
803 0000002C DIR32 00000000  21        ?extVal@@3HA (int extVal)         502
  00000034 DIR32 00000000    11        ?probVal@@3HA (int probVal)
                                  658                                   504
                               654
```

FIG. 8B (Prior Art)

```
-----Output of running Pre-processor program-----
C++ Initializer Pre-processor program(for x86)
Written by Mike Marcelais (michmarc), October, 1997;
sample.obj:
        Function: _$E2  ←──────────────── 702
            19 instructions executed. ──── 704
        Function: _$E5  ←
            WARNING: Unable to optimize -- reading from
            external memory.    Symbol int  extVal Eliminated 1 out of 2 static initializers.
-----End of output-----
```

*FIG. 9*

| Symbol Number | Address | Section | Symbol Type | Entry Type | Name | Extra Records | | | |
|---|---|---|---|---|---|---|---|---|---|
| 000 | 00000015 | DEBUG | notype () | Filename | .file | sample.cpp | | | |
| 002 | 00000000 | SECT1 | notype () | Static | .drectve | Section length 26 | #relocs 0 | #linenums 0 | |
| 004 | 0000000A | SECT2 | notype () | Static | .debug$S | Section Length 20B | #relocs 18 | #linenums 0 | |
| 006 | 00000000 | SECT3 | notype () | Static | CRT$XCU | Section length 4 | #relocs 1 | #linenums 0 | |
| 008 | 00000004 | SECT3 | notype () | Static | $S6$S186 | | | | |
| 009 | 00000000 | SECT3 | notype () | Static | $S3$S180 | | | | |
| 00A | 00000004 | SECT4 | notype () | Static | .data | Section length 8 | #relocs 1 | #linenums 0 | |
| 00C | 00000000 | SECT4 | notype () | External | ?addrVal@@3HA (int addrVal) | | | | |
| 00D | 00000000 | SECT4 | notype () | External | ?dataVal@@3HA (int addrVal) | | | | |
| 00E | 00000000 | SECT5 | notype () | Static | .bss | Section length 8 | #relocs 0 | #linenums 0 | |
| 010 | 00000000 | SECT9 | notype () | External | ?complexVal@@3HA (int complexVal) | | | | |
| 011 | 00000000 | SECT5 | notype | External | ?probVal@@3HA (int probVal) | | | | |
| 012 | 00000000 | SECT6 | notype () | Static | .text | Section length 46 | #relocs 6 | #linenums 5 | |
| 014 | 00000000 | SECT6 | notype () | Static | $E2 | tag index 00000019 | size 00000014 | lines 00000917 | |
| 015 | 00000000 | DEBUG | notype () | Filename | .file | sample.cpp | | | |
| 017 | 0000000A | SECT6 | notype () | Static | $E1 | line# 0006 | | | |
| 019 | 0000000A | SECT6 | notype () | BeginFunction | .bf | line# 0006 | | | |
| 01B | 00000001 | SECT6 | notype () | bf or .ef | .lf | | | | |
| 01C | 0000001E | SECT6 | notype () | EndFunction | .ef | | | | |
| 01E | 0000001E | SECT6 | notype () | Static | $E5 | tag index 00000022 | size 00000012 | lines 0000091D | next function 00000027 |
| 01F | 00000028 | SECT6 | notype () | Static | $E4 | | end 00000029 | | |
| 021 | 00000000 | UNDEF | notype | External | ?extVal@@3HA (int extVal) | | | | |
| 022 | 00000000 | SECT6 | notype () | BeginFunction | .bf | line# 0007 | | | |
| 024 | 0000000l | SECT6 | notype () | .bf or .ef | .lf | line# 0007 | | | |
| 025 | 0000003A | SECT6 | notype () | EndFunction | .ef | | | | |
| 027 | 0000003A | SECT6 | notype() | External | ?square@@YAHH@Z (int _cdecl square(int) | tag index 00000029 | size 0000000C | lines 00000923 | next function 00000000 |
| 029 | 0000003A | SECT6 | notype () | BeginFunction | .bf | line# 000a | end 00000000 | | |
| 02B | 00000003 | SECT6 | notype () | .bf or .ef | .lf | line# 000a | | | |
| 02C | 00000046 | SECT6 | notype () | EndFunction | .ef | line# 000c | | | |
| 02E | 00000000 | SECT7 | notype () | Static | .debug$T | Section length 24 | #relocs 0 | #linenums 0 | |

FIG. 11

SYSTEMS AND METHODS FOR PRE-PROCESSING VARIABLE INITIALIZERS

TECHNICAL FIELD

The present invention relates generally to the initialization of variables in a computer program. More particularly, the present invention relates to the pre-processing of variable initializers and the exclusion of the variable initializers from a binary image.

BACKGROUND OF THE INVENTION

In computer programming the term "variable" is used to refer to a named storage location capable of containing a certain type of data that can be accessed and/or modified during execution of the program. A global variable is a variable that may be accessed by any function, statement or piece of code in a program. Typically, global variables are initialized to a default value upon each start-up of a computer program. Some programming languages allow only simple initializations of global variables, i.e. initializations of simple expressions or constant values. However, other programming languages, such as "C++," allow complex initializations of global variables, i.e. the evaluation of function calls or complex routines.

During every start-up of a computer program, some amount of time is consumed by the initialization of all the global variables. Complicated C++ programs may contain hundreds or even thousands of global variables requiring complex initialization. Thus, a common problem associated with large C++ programs is a significant latency in start-up time due to the initialization of global variables.

A C++ compiler converts source code (human-readable program statements written in a high-level or assembly language) into machine-readable object code, which is stored in object files. Object files are linked together, along with library files, to produce an computer program, comprising an executable file and zero or more dynamic link libraries. During compilation of the source code, when a C++ compiler encounters an uninitialized global variable of sufficient complexity and requiring initialization, the compiler generates and stores in the object file an additional function (or segment of computer code) called an "initializer." After the object files are linked with the library files, the initializer will become part of the computer program. The initializer will be responsible for initializing the global variable upon start-up of the computer program. A complicated C++ program having hundreds or thousands of global variables will have a corresponding number of initializers.

A prior art method for reducing the latency involved in processing initializers upon start-up of a computer program is to optimize the initializer in the object file prior to creation of the executable file. In the past, compilers have been configured to perform optimizations on the object code that makes up an initializer. Prior art compilers have been configured with the ability to eliminate needless function calls, simplify expressions and generally cause the initializer object code to be smaller and faster. Thus, when the object file is linked with library files, the optimized initializer is incorporated into the computer program and the latency associated with the initialization of global is reduced.

Still, configuring a compiler to optimize an initializer in an object file typically does not allow for complete exclusion of the initializer from the computer program. Often, a compiler will be able to reduce an initializer to a single instruction. However, a compiler generally does not have the ability to speculatively execute an instruction to see what the result would be if it were executed by a fully operational computer program. Thus, even if the compiler is able to reduce the initializer to a single instruction, this instruction will still have to be processed upon every start-up of the computer program. As such, even initializer optimization is generally not fully effective to reduce latency involved with the initialization of global variables for a complicated C++ program having hundreds or thousands of initializers.

Accordingly, there remains a need in the art for a system and method for pre-executing an initializer prior to creation of a computer program. There also remains a need for a system and method for excluding an initializer from an computer program so as to eliminate latency caused by processing the initializer upon start-up of the computer program.

SUMMARY OF THE INVENTION

The present invention fulfills the needs in the art by providing systems and methods for pre-processing an initializer and excluding the initializer from the computer code that comprises a binary image, i.e. a computer program. One or more files are typically processed by a linker to create a binary image. These files may be object files or library files. The initializer may be pre-processed during one or more of three stages involved in the creation of a binary image: prior to operation of the linker; during operation of the linker; and after operation of the linker. If the initializer is successfully pre-processed, an initialized value for a variable is determined. This initialized value is written into the binary image and all references or calls to the initializer are excluded from the binary image. Thus, during all subsequent start-ups of the binary image, no initialization of the variable will be performed.

BRIEF DESCRIPTION OF THE DRAWINGS

FIG. 5 shows an example of C++ source code, which forms the basis for an illustration of the operation of an exemplary embodiment of the present invention, discussed with reference to FIGS. 6–11.

FIG. 6 provides a representation of a symbol table that is generated by compiling the source code of FIG. 5;

FIG. 9 is an exemplary report of the results obtained by performing the method of present invention on the sample object file which is created by compiling the source code of FIG. 5;

FIG. 11 illustrates the symbol table of FIG. 6, after it has been modified to reflect the fact that the initialized value was written into the new Section of the object file shown in FIG. 10;

DETAILED DESCRIPTION OF THE PREFERRED EMBODIMENTS

Figure 1:
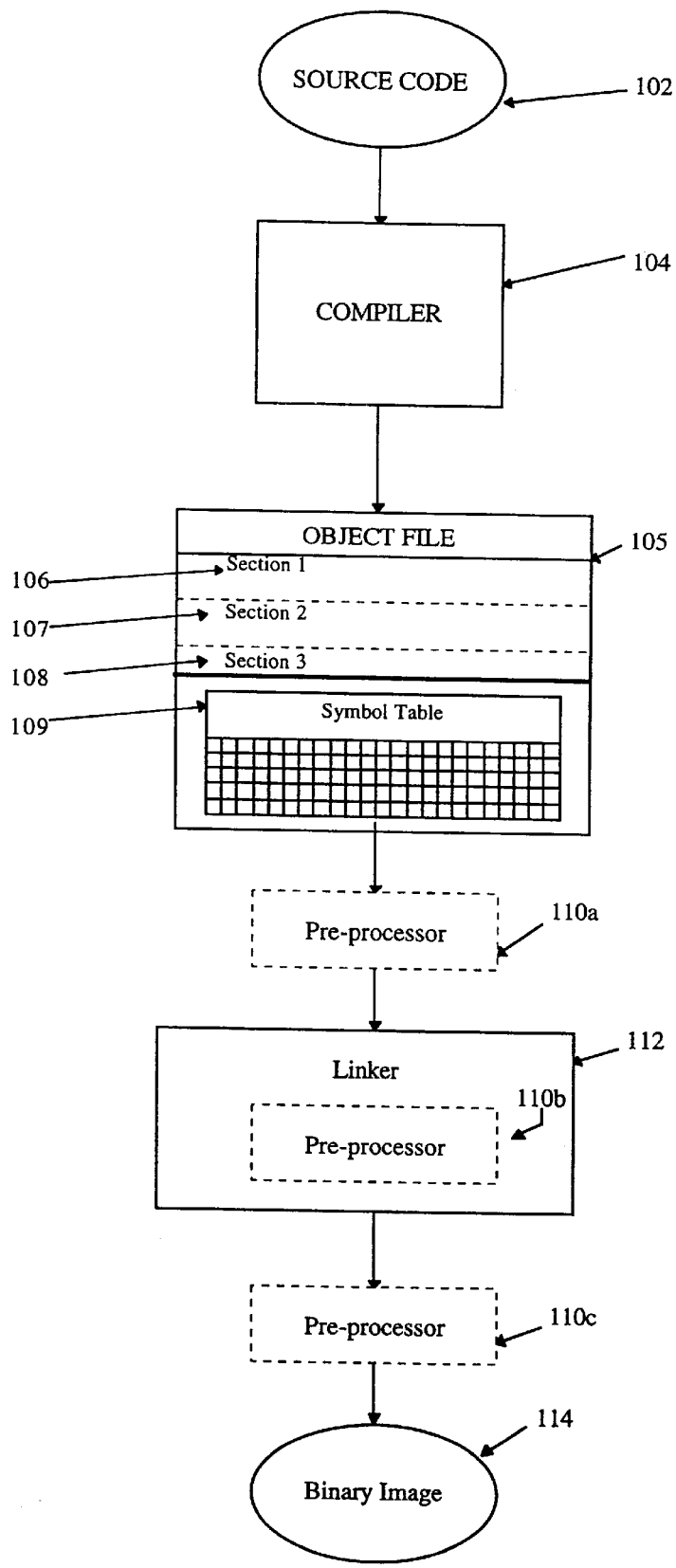
FIG. 1 provides an overview of the evolution of a C++ program, from source code to a binary image.

The present invention relates to methods and systems for pre-processing an initializer and excluding the initializer from a binary image. The present invention attempts to pre-process an initializer prior to creation of a binary image. The phrases "pre-process," "pre-execute," "pre-initialize," "pre-initialization" and derivations thereof will be used throughout this description to refer to the processing (loading and execution) of an initializer, so as to determine an initialized value for a variable, prior to creation of the final version of a binary image. By pre-processing an initializer, an initialized value for a variable may be determined and written into the final version of the binary image, eliminating the need to process the initializer upon start-up of the final version of the binary image. Thus, pre-processing of an initializer causes a variable to be pre-initialized.

A computer program is made up of machine-readable code in a format that can be loaded into the computer memory and run. A computer program comprises an "executable" and can also include zero or more "dynamic link libraries." thus a program is often referred to as an "executable image," or a "binary image." For the sake of consistency, the term "binary image" will be used throughout the following description to refer to a computer program and encompass executables (.exe), dynamic link libraries (.dll), and any other linked data files. The "final version" of a binary image is intended to mean the completed version of the binary image that is executed by the end-user.

An "initializer" is a statement, function, routine, set of instructions or any other segment of computer code that is responsible for the initialization of a variable or expression. With respect to programming variables, "initialization" commonly means assigning a beginning value to a variable. Typically, an initializer is processed (loaded and executed) upon start-up of a binary image to assign a default value of a variable. The loading and execution of a complex initializer, i.e., one that is responsible for a complex initialization of a variable, may result in delay or latency in the start-up time of the a binary image.

It should be noted that non-static initializers that are not pre-processed must be processed upon every start-up of a binary image. When a binary image is run and initializers are processed, an uninitialized data area is created in the temporary memory of the computer. This temporary memory is then initialized by the appropriate initializers. The initialized data in the temporary memory is never copied back into the binary image file on disk. When the binary image is terminated, all of the initialized data in the temporary memory is discarded. The next time the binary image is run, all original uninitialized data is again loaded into temporary memory and all appropriate initializers are processed. Therefore, excluding initializers from a binary image will provide a significant savings of start-up time every time a binary image is run.

Computer programs written in the C++ programming language often include complex initializers. The C++ language supports global variables, which are variables that may be accessed by any function, statement or piece of code in a program. Typically, all global variables in a C++ program are set to a default value upon start-up of the binary image. A complicated C++ program may include hundreds or thousands of global variables and, correspondingly, hundreds or thousands of initializers. Thus, significant delay or latency in the start-up time of a C++ program may be reduced by pre-initializing global variables, thus eliminating the need to process (i.e. load and execute) initializers during start-up of the binary image. Therefore, an exemplary embodiment of the present invention will be described as being concerned with eliminating global variable initializers from a C++ program. However, as will be appreciated by those having ordinary skill in the art, the present invention may be configured for use with programs written in any programming language that supports initializers. Further, the present invention is not limited in scope to the pre-initialization of global variables. Any variable, global, local or otherwise, that is initialized by an initializer during the execution of a binary image may be pre-initialized by the systems and methods of the present invention.

The description of the exemplary embodiment of the present invention will hereinafter refer to the drawing, in which like numerals indicate like elements throughout the several figures. Since the exemplary embodiment of the present invention will be discussed with reference to a C++ program, FIG. 1 provides an overview of the evolution of a C++ program. A C++ program is conceived when a computer programmer creates source code 102, which is comprised of human-readable program statements. A compiler 104 then converts the source code 102 into machine-readable object code, which is stored in one or more files. Object code may be stored in an object file 105 or in a library file. A compiler may create more than one files, depending on the nature of the source code. A linker 112 processes a file to produce a binary image 114. Typical operation of a linker 112 involves linking object files together, along with library files and data files.

Typical object files, like object file 105, contain one or more "sections" 106–108, which are segments of data and object code responsible for performing particular tasks. Object files typically also contain a "symbol table" 109, which serves as an index or reference to items within the various sections of the object file. Every logical entity, i.e. every variable, constant, function, routine, etc. is represented by a symbol in the symbol table. A "symbol table" is broadly defined as a list of all identifiers encountered when a program is compiled, their locations in the program, and their attributes, such as variables, routines, and so on. A symbol table 109 is stored as part of the object file 105 so that the linker 112 can resolve references between sections of the object file and separately compiled modules or files. Within the symbol table 109, variable symbols may refer to a variable that is initialized (having a known value) or uninitialized (having an unknown value).

When a C++ compiler encounters in the source code an uninitialized global variable of sufficient complexity to require initialization, the compiler generates an additional function called an "initializer," that will be responsible for initializing the global variable upon start-up of the binary image. An initializer is stored in one of the sections of the object file and is referenced in the symbol table by a special symbol, referred to herein as an initializer-list symbol (See 701 of FIG. 7 and accompanying discussion). For example, in Microsoft's Visual C++, the initializer-list symbol is ".CRT&XCU". Those skilled in the art will appreciate that other versions of C++ may use different initializer-list symbols.

After C++ source code 102 is compiled into object files 105, the present invention 110 may be employed to pre-process initializers and exclude the pre-processed initializers from the final version of a binary image. The present invention may be employed at one or more of three phases following compilation of the source code. First, the present invention 110a may be employed before the object files are passed to the linker 112 to be linked with library files to create the final version of the binary image 114. Second, the present invention 110b may be incorporated into the linker and combined with linker functionality. Third, the present invention 110c may be employed after the linker has created a binary image. In this third scenario, the present invention 110c operates on a binary image created by the linker to produce a final version of the binary image having one or more pre-initialized variables. The details involved in the pre-processing of an initializer will be explained below.

So as to address the requirement for describing the best mode for carrying out the present invention and providing a full written description of the invention, an exemplary operating environment for the invention will be set forth, followed by a complete description of how a person skilled in the art makes and uses the invention.

Exemplary Operating Environment

Figure 2:
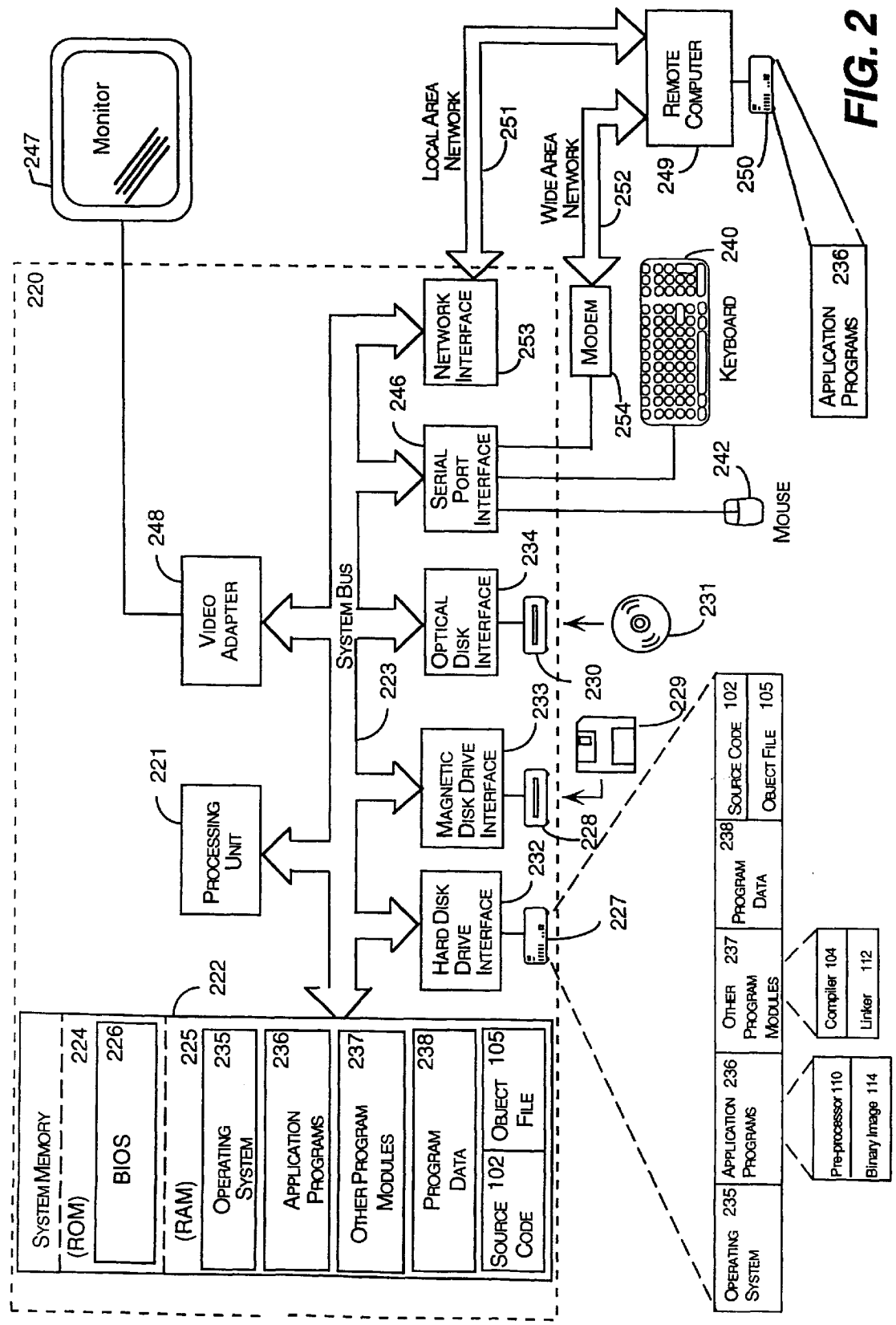
FIG. 2 is a flow chart that provides a general outline of the operation of an exemplary embodiment of the present invention.

FIG. 2 and the following discussion are intended to provide a brief, general description of a suitable computing environment in which the present invention may be implemented. While the present invention will be described in the general context of a software program for pre-executing initializers that run on an operating system in conjunction with a personal computer system, those skilled in the art will recognize that the invention may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a conventional personal computer 220, including a processing unit 221, a system memory 222, and a system bus 223 that couples the system memory 222 to the processing unit 321. The system memory 222 includes read only memory (ROM) 324 and random access memory (RAM) 225. A basic input/output system 226 (BIOS), containing the basic routines that help to transfer information between elements within the personal computer 220, such as during start-up, is stored in ROM 224.

The personal computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 244, respectively. The drives and their associated computer-readable media provide nonvolatile storage for the personal computer 220. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, and the like, may also be used in the exemplary operating environment.

A number of program modules may be stored in the drives and RAM 225, including an operating system 235, one or more application program modules 236, other program modules 237, and program data 238. In particular, one of the application program modules 236 is the software program 110, comprising computer implemented instructions for carrying out the method of the present invention, embodiments of which are described below with reference to the remaining drawing figures. Other program modules 237 may include compiler 104 and linker 112. In addition, source code 102, object file 105, and other data files may be stored in the drives or in RAM 225.

Other input devices (not shown) may include a microphone, joystick, game pad, satellite dish, scanner, or the like. These and other input devices are often connected to the processing unit 221 through a serial port interface 246 that is coupled to the system bus, but may be connected by other interfaces, such as a game port or a universal serial bus (USB). A monitor 247 or other type of display device is also connected to the system bus 223 via an interface, such as a video adapter 248. In addition to the monitor, personal computers typically include other peripheral output devices (not shown), such as speakers or printers.

The personal computer 220 may operate in a networked environment using logical connections to one or more remote computers, such as a remote computer 249. The remote computer 249 may be a server, a router, a peer device or other common network node, and typically includes many or all of the elements described relative to the personal computer 220, although only a memory storage device 250 has been illustrated in FIG. 2. The logical connections depicted in FIG. 2 include a local area network (LAN) 251 and a wide area network (WAN) 252. Such networking environments are commonplace in offices, enterprise-wide computer networks, intranets and the Internet.

When used in a LAN networking environment, the personal computer 220 is connected to the LAN 251 through a network interface 253. When used in a WAN networking environment, the personal computer 220 typically includes a modem 254 or other means for establishing communications over the WAN 252, such as the Internet. The modem 254, which may be internal or external, is connected to the system bus 223 via the serial port interface 246. In a networked environment, program modules depicted relative to the personal computer 220, or portions thereof, may be stored in the remote memory storage device. It will be appreciated that the network connections shown are exemplary and other means of establishing a communications link between the computers may be used. It will be further appreciated that the invention could equivalently be implemented on host or server computers other than personal computers, and could equivalently be transmitted to the host computer by means other than a CD-ROM, for example, by way of the network connection interface 253.

Notwithstanding the broad applicability of the principles of the invention described above, it should be understood that the configuration of the exemplary embodiment as an application program for widely-used personal computers provides significant advantages. In particular, the software program 110, comprising computer-implemented instructions for performing the method of the present invention, described in this specification is specifically designed to exhibit acceptable memory-use and performance characteristics when implemented on the conventional personal computer system 220. In so configuring the software program 110, certain trade-off balances, particularly between the often conflicting goals of minimizing memory storage and increasing performance speed, have necessarily been struck. It should be understood that variations of the trade-off balances struck in the exemplary embodiments described in this specification are within the spirit and scope of the present invention, particularly in view of the fact that inevitable improvements in computer hardware and memory storage devices will make other trade-off balances feasible.

Operation of an Exemplary Embodiment

In the following description of an exemplary embodiment of the present invention, an initializer is pre-processed after compilation of the source code, but prior to linking of object and/or library files. Still, the following exemplary embodiment does not represent the only manner in which the present invention may be implemented. The principles of the following exemplary embodiment may be applied to alternative embodiments, as will be discussed later.

Figure 3:
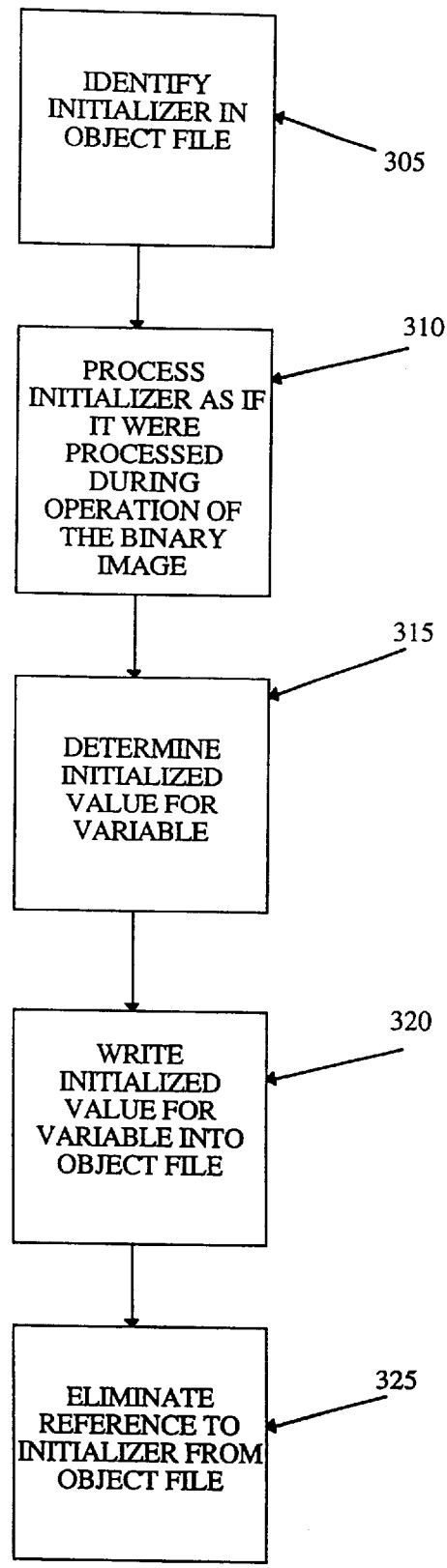
FIG. 3 is a functional block diagram of a computer system that provides an operating environment for the exemplary embodiments of the invention.
Figure 8:
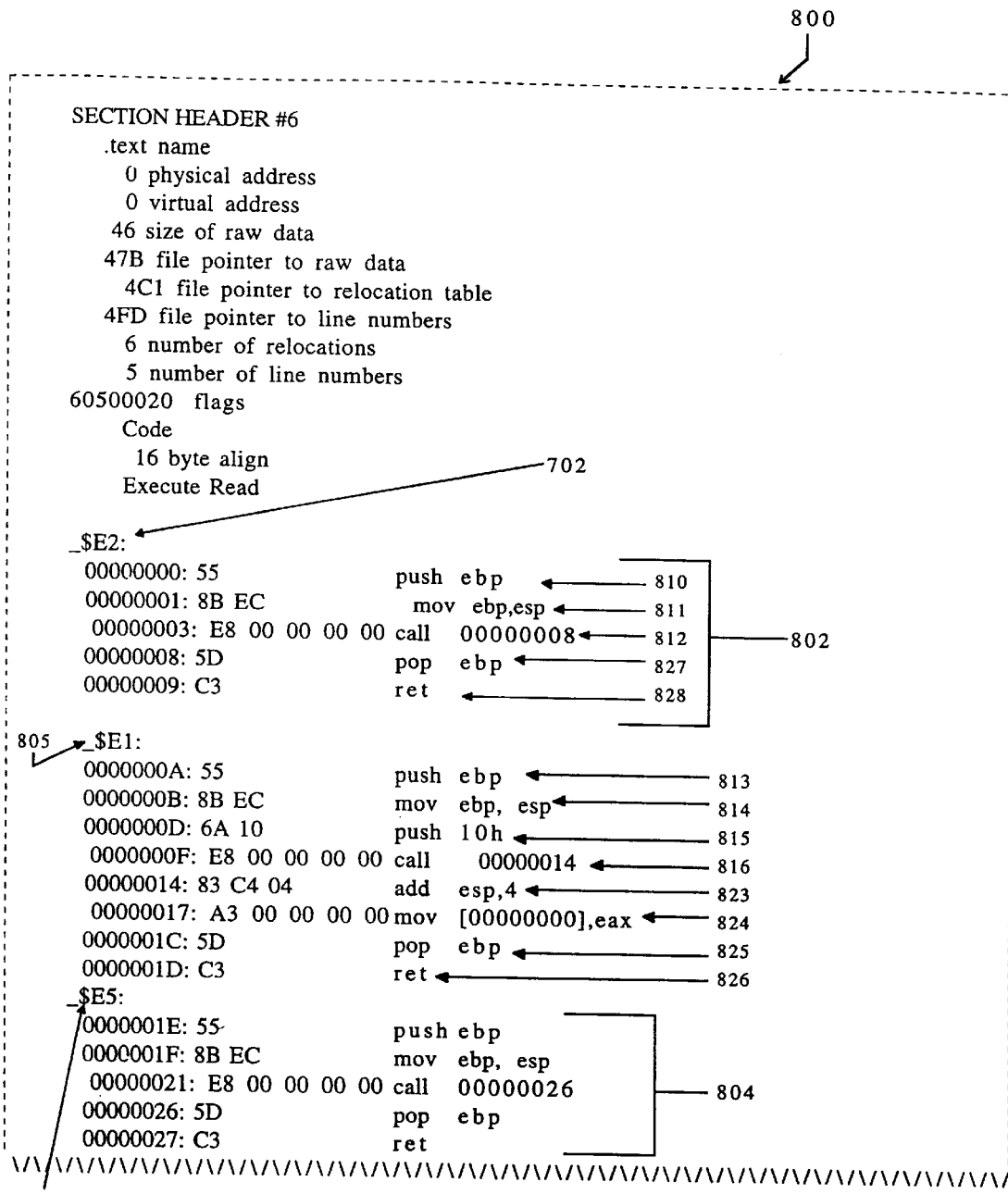
FIG. 8, consisting of FIG. 8A and FIG. 8B, shows a Section, containing initializers, of the object file created by compiling the source code of FIG. 5.

FIG. 3 generally outlines the operation of an exemplary embodiment, which pre-processes an initializer prior to linking. In step 305, the present invention searches the object file 105 (FIG. 1), to identify an initializer. Once the initializer is identified, the computer code or set of initializing instructions that comprises the initializer is pre-processed in step 310 as if it were being processed during execution of the binary image. The details of pre-processing an initializer will be explained in detail below, with reference to FIG. 8. When pre-processing is successful, the present invention is able to determine an initialized value for a variable in step 315. If an initialized value for the variable is determined, the initialized value is written into the object file in step 320 as a static data value and a reference to the initializer is eliminated or deleted from the object file in step 325. In addition to eliminating the reference to the initialize from the object file, the entire initializer may be removed or deleted. However, removal of the entire initializer is an unnecessary step, because elimination of the reference to the initializer causes the linker 112 (FIG. 1) to bypass the initializer during linking. Thus, the linker does not incorporate the initializer into a binary image. As such, the initializer is excluded from the binary image 114 that is produced by the linker 112 (FIG. 1), even though the actual initialize may not have been deleted from the object file. As a result, the initializer is not processed upon start-up of the executable program. By excluding as many initializers as possible from the binary image, the time required for start-up of the binary image may be reduced. The particulars of writing the initialized value into the object file and eliminating a reference to the initializer from the object file will be discussed in detail below, with reference to FIGS. 4, 10, and 11.

In order to pre-process an initializer, the exemplary embodiment of the present invention must first identify the initializer in an object file. Once the initializer has been identified, the exemplary embodiment pre-processes the initializer as if it were processed during the execution of a binary image. Upon successful execution of an initializer, an initialized value for a variable will be determined. This initialized value is written into the object file and a reference to the initializer is removed from the object file, so that the initialized value, and not the initializer, is incorporated into the binary image by the linker.

As mentioned above with reference to FIG. 1, an object file 105 comprises a symbol table 109 and one or more section 106–108 comprised of data and object code. Typically, one of the sections in an object file will contain and "initializer-list," which is a list of symbols representing initializers that are to be processed upon start-up of the binary image. An actual initializer, i.e. computer code representing initializing instructions for initializing a variable, is typically stored in a section that is different from the section in which the initializer-list is stored. Thus, the present invention must navigate back and forth between the symbol table and various sections in the object file in order to locate the section in which a selected initializer resides.

Figure 4A:
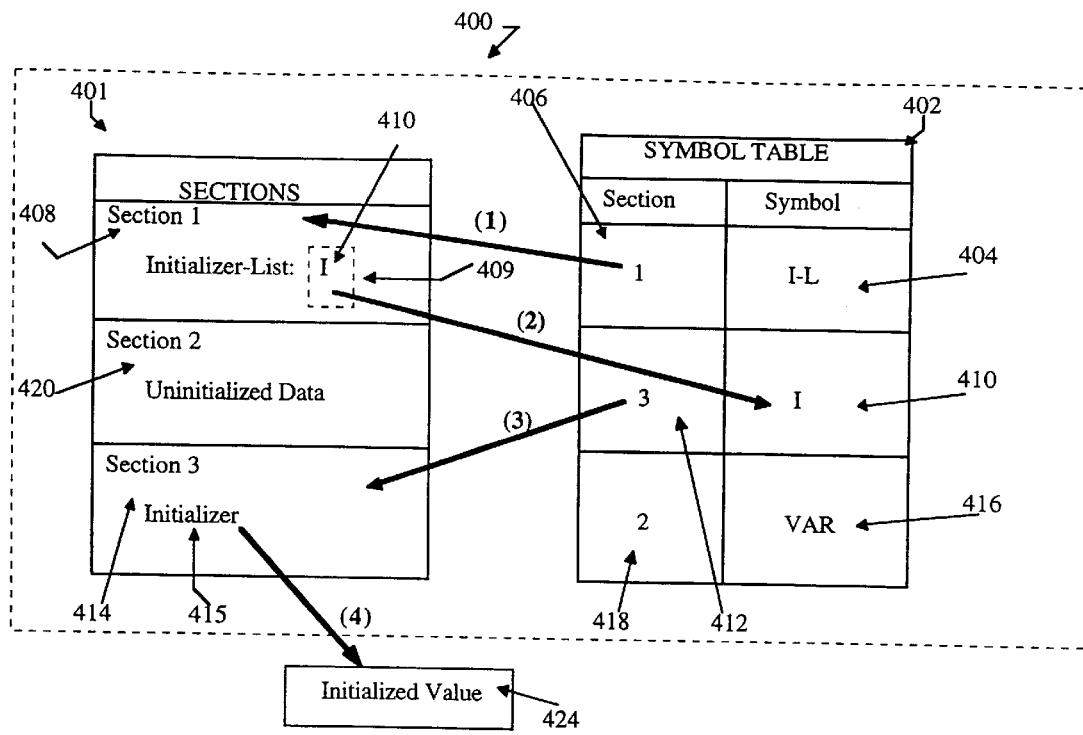
FIG. 4, consisting of FIG. 4A and FIG. 4B, describes an exemplary method for identifying an initializer in an object file, and presents a graphical representation of the object file after it has been modified by writing an initialized value therein and removing a reference to an initializer therefrom.

In FIG. 4A, an exemplary method for identifying an initializer in an object file 400 is described. The graphical representation of the object file 400 in FIG. 4A includes of a list of sections 401 and a symbol table 402. Symbol table 402 includes a symbol "I–L" 404, generically representing an initializer-list. Corresponding to symbol I–L 404 is a reference 406, also called a pointer or an index, to Section 1 408, which stores the initializer-list 409. They symbol table 402 also includes an entry for the symbol "I" 410, which generically represents an initializer 415.

Corresponding to symbol I 410 is a reference 412 in the symbol table to Section 3 414, which stores the object code comprising the initializer 415. Also included in symbol table 402, is a symbol "VAR" 416, generically representing the variable which is to be initialized by the initializer 415. Corresponding to the symbol VAR 416 is a reference 418 to Section 2 420, which signifies that the variable is presently being stored as uninitialized data.

In operation, the exemplary embodiment of the present invention searches the symbol table 402 to identify the initializer-list symbol I–L 404. As indicated by bolded arrow (1), based on reference 406, the present invention proceeds to Section 1 408, where the initializer-list 409 is searched for symbols representing initializers. In initializer-list 409, the present invention identifies a symbol I 410, representing an initializer. As shown by bolded arrow (2), the exemplary embodiment returns to the symbol table 402 to search for an entry corresponding to symbol I 410. Then, based on reference 412, the exemplary embodiment proceeds to Section 3 414, shown by bolded arrow (3), where the initializer 415 corresponding to the symbol I 410 is located. The initializer 415 comprises initializing instructions for initializing a variable. The exemplary embodiment then attempts to pre-process the initializing instructions as if the initializer 415 were an independent binary image. If the present invention is able to successfully pre-process the initializer 415, an initialized value 424 for the variable is determined, as indicated by bolded arrow (4).

Assuming that the initializer 415 is successfully processed, the exemplary embodiment of the present invention then writes the initialized value into the object file as a static data value and, also in the object file, eliminates a reference to the initializer 415. In the exemplary embodiment, for the sake of simplicity, the initializer 415 itself is not erased or deleted from the object file. Rather, the symbol I 410 is eliminated from the initializer-list 409 of Section 1 408. The initialized static data value 424 for the variable is written into a new section in the object file and the symbol table 402 is updated so that the symbol VAR 416 corresponds to the initialized static data value.

Figure 4B:
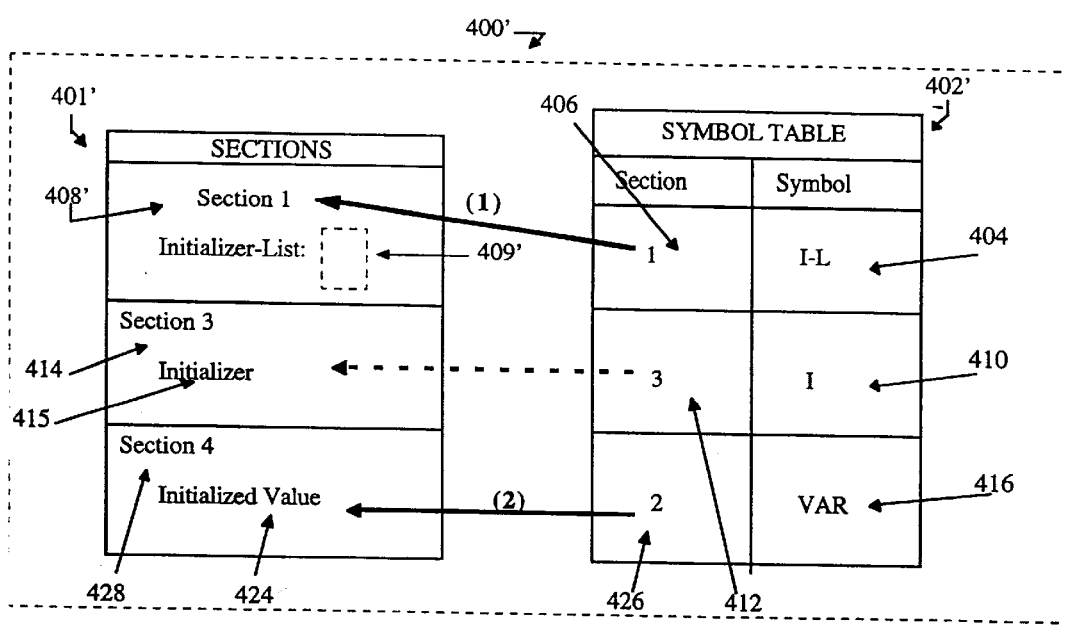

FIG. 4B represents a modified object file 400' after the initialized static data value 424 has been written therein and a reference to the initializer 415 has been removed. In FIG. 4B, modified symbol table 402' still contains the symbol I–L 404, which has a corresponding reference 406 to modified Section 1 408'. Modified symbol table 402' also still contains an entry for the symbol I 410 and a corresponding reference 412 to Section 3 414, where the initializer 415 is stored. However, the modified initializer-list 409' in modified Section 1 408' does not include the symbol I 410 (FIG. 4). The symbol I 410 (FIG. 4A) in the initializer-list 409 (FIG. 4A) of the original Section 1 408 (FIG. 4A) was the only reference that would have alerted a linker (see, for example, Linker 112, FIG. 1) that the initializer 415 was to be incorporated into a binary image. By removing the symbol I 410 from modified initializer-list 409', the initializer 415 will not become part of a binary image after the modified object file 400' is passed through a linker. The modified object file 400' may be created as a new file having the same filename as the original object file 400, after the original object file 400 is deleted. In addition, the modified object file 400' may simply be a revised version of the original object file 400'.

The above example referencing FIG. 4 was meant to generally demonstrate the method involved in the exemplary embodiment of the present invention. Turning now to FIGS. 5–13, the method of the present invention will be described in greater detail, using an actual C++ program as a demonstration.

FIG. 5 shows an example of actual C++ source code 500. Source code 500 is a program fragment that includes the global variables "complexVal" 502, "extVal" 504, "dataVal" 506 and "addrVal" 508. When source code 500 is compiled by a C++ compiler, initializers will be generated for each of the global variables 502 and 504. No initializers will be created for the global variables "dataVal" 506 and "addrVal" 508 because each have simple initialization values that the C++ compiler will be able to evaluate to a static data value. The object code generated by the compiler is stored in an object file, the portions of which that are most relevant to the present invention are shown in FIGS. 6–11. Since object code is machine-readable and not human-readable, the portions of the object file shown in FIGS. 6–11 have been translated into human-readable form by a program of the type commonly know as a "dump" program. Much of the "dumped" object code appears as cryptic phrases and numbers in hexadecimal format. However, those having ordinary skill in the art will be have a general understanding of the content and functionality of the "dumped" object code presented in the following figures.

FIG. 6 provides a representation of an exemplary symbol table 600 that is generated by compiling the source code 500 (FIG. 5). The symbol table 600 includes an initializer-list symbol 650 representing the initializer-list. The initializer-list symbol 650 of ".CRT&XCU" is used by the Microsoft Visual C++ compiler. Other C++ compilers may use a different symbol to denote or represent an initializer-list. It can be seen from reference 652, corresponding to the initializer-list symbol 650, that the initializer-list is stored in Section 3 of the object file.

Figure 7:
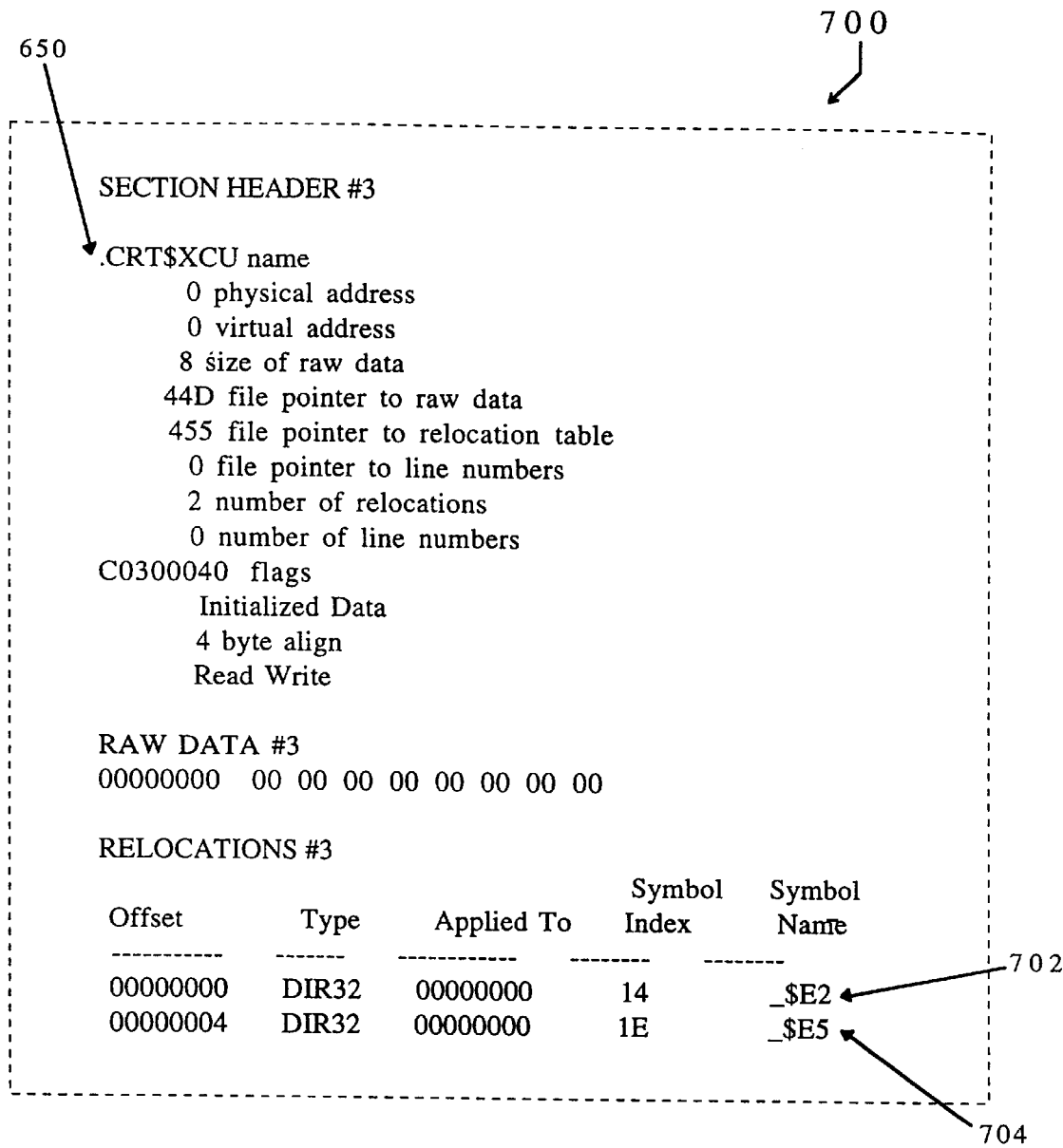
FIG. 7 provides a representation of a Section, containing an initializer-list, of the object file created by compiling the source code of FIG. 5.

FIG. 7 provides a representation of Section 3 700 of the object file created by compiling source code 500 (FIG. 5). Note that the initializer-list 701 shows two initializer symbols __$E2 702 and __$E5 704. It may be unclear through human inspection of Section 3 700 that symbols __$E2 702 and __$E5 704 are in fact initializer symbols. However, through internal mechanisms, the compiler and the linker know that the symbols named as relocation entries in this Section are initializer symbols. A "relocation entry" is a reference that indicates to the compiler or linker that a number in the raw data section refers to a symbol. Relocation entries are used as "temporary addresses" because, in an object file, no memory addresses are assigned to any symbols. After the object file is linked, memory addresses are assigned to all symbols and all the relocation entries are eliminated.

Initialize symbols act as a reference to the corresponding initializes. However, the sections which store the initializers corresponding to the initializer symbols cannot be determined directly from the initializer-list 701 in Section 3 700. Thus, the present invention returns to the symbol table 600 of FIG. 6 in order to identify the sections of the object file which store the initializers represented by the initializer symbols __$E2 702 and __$E5 704. In FIG. 6, reference 660 indicates that the initializer corresponding to the initialize symbol __$E2 702 is stored in Section 6. Likewise, reference 664 indicates that the initializer corresponding to the initializer symbol __$E5 704 is also stored in Section 6.

FIG. 8A and FIG. 8B show Section 6 800 of an object file created by compiling source code 500. Initializer 802 corresponds to the initializer symbol __$E2 702. Initializer 802 is a segment of object code comprising initializing instructions for initializing the variable "complexVal" 502, which is shown as a relocation entry in FIG. 8B. As can be seen in FIG. 8B, the variable symbol representing the variable complexVal 502 is variable symbol "?complexVal@@3HA" 654. Similarly, initializer 804 (FIG. 8A) corresponds to the initializer symbol __$E5 704. Initializer 804 comprises initializing instructions for initializing the variable extVal 504 (FIG. 8B), which is represented by the variable symbol "?extVal@@3HA" 658 in FIG. 8B.

The steps that have been described thus far have been focused on identifying initializers in an object file. The exemplary method of the present invention, while not the only method for identifying an initializer, allows an initializer to be identified with minimal advance knowledge of the syntax of C++ object code. Specifically, the exemplary embodiment of the present invention needs only the advance knowledge that an object file is formatted into sections and a symbol table and that initializer-list symbol, such as .CRT$XCU 650 or an equivalent, is used to identify an initializer-list. Given only this minimal advance knowledge of the object file, the present invention is able to identify all initializers and the corresponding variables.

Still, those skilled in the art will appreciate that alternate methods exist for identifying initializers in an object file. In particular, other versions of C++ may not utilize the same symbols as those that were discussed with reference to the exemplary embodiment of the present invention. However, the exemplary method may easily be altered to account for a different system of symbols. Further, some programming languages other than C++ may not utilize the sections and symbol table format when converting source code into machine-readable code. Thus, it should be appreciated that any method for identifying an initializer in a file of machine-readable code may be substituted for the exemplary method described above. It is not intended that the scope of the present invention be limited to the exemplary method for identifying an initializer in an object file. Furthermore, the scope of the present invention is not intended to be limited to identifying initializers in a C++ object file.

Once the initializers 802 and 804 have been identified, the exemplary embodiment of the present invention must attempt to pre-process each of the initializers, so as to pre-initialize the variables complexVal 502 and extVal 504, respectively. To pre-process an initializer, the present invention steps through the initializing instructions, while attempting to decode and execute each initializing instruction. However, processing of the initializer is speculative because the object files have yet to be linked together to create a binary image. Thus, the exemplary embodiment will not be able to process initializing instructions that make calls to functions, variables or statements located in other object files or in library files. Also, prior to linking, the functions and variables included in the object code have not been assigned memory addresses. So, when processing each instruction, the exemplary embodiment cannot refer to the functions and variables by memory addresses. Instead, the exemplary embodiment uses symbols from the symbol table to refer to the functions and variables.

While pre-processing an initializer, the exemplary embodiment may encounter three types of initializing instructions. A first type of initializing instruction has a result that is dependent on the state of the computer system. For example, an initializing instruction may ask the CPU to identify itself. Initializing instructions for accessing debug registers and clock counters are also system state dependent. Initializing instructions that are system state dependent cannot be executed prior to creation of the binary image, since the result may be different every time the binary image is run. Thus, the exemplary embodiment will not be able to pre-process an initializer having an initializing instruction that is system state dependent.

A second type of initializing instruction that may be encountered by the exemplary embodiment is one that refers to a symbol in the symbol table of the object file. When encountering this type of initializing instruction, the exemplary embodiment must access the symbol table to determine whether the symbol exists in one of the sections of the object file. If the symbol does not exist in the object file, i.e., it exists externally in some other object file that is not yet linked to the present object file, the exemplary embodiment will be unable to process the initializer. If the symbol does exist in one of the sections of the object file, the exemplary embodiment may readily determine its value and execute the instruction, but only if it is marked as initialized, i.e. it has a known value. If the symbol is marked as uninitialized, its value is indeterminable and the exemplary embodiment will again by unable to successfully process the initializer.

One exception exists to the above statement that a symbol marked as uninitialized will cause the exemplary embodiment of the present invention to fail in pre-processing of an initializer. This exception occurs when the symbol marked uninitialized represents the variable that is to be initialized by the initializer. Obviously, the variable to be initialized will originally be uninitialized. So, when the initializer call an instruction for writing to the uninitialized variable, the pre-processing of the initializer continues with the allocation of memory space for the variable. All modifications to the variable caused by the initializer are written to the allocated memory space. If pre-processing of the initializer subsequently fails, the modified variable in memory is deleted. However, upon successful pre-processing of the initializer, the modified variable in memory becomes the pre-initialized variable.

A third type of initializing instruction that may be encountered by the exemplary embodiment is one that is manipulates registers, flags, and various other internal processor elements. This third type of initializing instruction involves internal processor instructions not falling within the first and second types of instructions mentioned previously. For example, instructions for manipulating debug registers and clock counters manipulate internal processor elements, but such instructions would be considered as being of the first type of initializing instruction, and not the third type of initializing instruction, because they are dependent on the state of the computer. Thus, this third type of instruction simply involves the manipulation of memory registers and is not dependent on the state of the system, memory addresses, or symbols external to the object file. Therefore, this third type of initializing instruction may be pre-processed by the exemplary embodiment of the present invention.

Referring again to FIG. 8, the precise pre-processing of initializer 802 will now be described. All of the initializing instructions have an instruction name (which is translated for human readability from the "opcode" in binary format that the computer handles), followed by one or more parameters. The first initializing instruction "00000000: push ebp" 810 instructs the computer to take a value, i.e., the register named "ebp," and put it on the "stack." As will be known be those skilled in the art, the stack is a special area of memory where items can be stored temporarily. When the computer "pushes" a value, it places the value at the top of the stack, "pushing" down anything that was on the stack. In contrast, the "pop" instruction tells the computer to remove the top item of the stack, which causes all values below it to "pop up."

The next initializing instruction "00000001: mov ebp, esp" 811 instructs the computer to move the second argument, i.e., the register "esp" (which is referred to as the "stack pointer" because it specifies where in memory the "top" stack is actually located), into the first argument, i.e., the register named ebp. The following initializing instruction "00000003: call 00000008" 812 instructs the computer to run a subroutine, and to return to this instruction when finished. The address of the subroutine to call is specified by the parameter and that address is to be determined by the linker. At present, the address is of the subroutine is zero, which indicates that the computer is to call the subroutine which is located zero bytes after the current instruction. To figure out the location of the address, the computer uses the relocation table 806 at the end of the section. The first entry 807 in the relocations table 806 indicates that location "00000004" refers to "__$E1" 805 So, the current location is "pushed " on the stack, and the processor starts executing the code at __$E1 805.

The first initializing instruction under __$E1 805 is "0000000A: push ebp" 813. Again, register "ebp" is to be pushed on the stack. Next, the initializing instruction "0000000B: mov ebp, esp" 814 is encountered. Again, the stack pointer esp is to be copied into register "ebp." Initializing instruction "0000000D: push 10h" 815 follows. This instruction tells the computer to push the number 16 (10 in hexadecimal, which is what the "h" stands for) onto the stack. The next initializing instruction "0000000F: call 00000014" 816 is another "call" instruction. In the relocation table 806, location 10 (the second entry) 808, shows that this call instruction refers to the ?square@@YAHH@Z subroutine 809, at location 3A. So we push our current location onto the stack and start executing code at ?square@@YAHH@Z 809.

The first two initializing instructions under ?square@@YAHH@Z 809 are "0000003A: push ebp" 817 and "0000003B: mov ebp, esp" 818 These instructions tell the computer to push register "ebp" onto the stack again and to copy the stack pointer esp into register ebp. The next initializing instruction "0000003D: mov eax, dword ptr [ebp+8]" 819 is another move instruction, but one that deserves further explanation. Register ebp contains a copy of the stack pointer. "dword ptr [ebp+8]" tells the computer to go the memory location that is 8 bytes past the memory address of the ebp register, and to read a "dword"

(doubleword—a 32 bit value) from memory. The dword is then to be copied it into register eax. "[ebp+8]" is going to be the third item on the stack ("[ebp]" is the first item on the stack and "[ebp+4]" is the second.) Working backwards, the top item is the "old" value of ebp (pushed during instruction 0000003A 817); the second item is the address to return from the "call" instruction at location 0000000F 816, and the third item is the 16 pushed by the instruction at location 0000000D 815. So the register eax now contains the number 16.

The next initializing instruction encountered is "00000040: imul eax, dword ptr [ebp+8]" 820. "imul" stands for "integer multiply." The computer is instructed to multiply the two parameters together, storing the result in the first parameter. The first parameter, register eax, contains the number 16 (from the previous instruction), and the second parameter, "dword ptr [ebp+8]" is also 16 (from the previous instruction). The product of the two parameters is 256, which is stored in the "eax" register. The following initializing instruction is "00000044: pop ebp" 821. Instruction 821 pops the top value of the stack, stores this value in register ebp, and moves all other values in the stack upward. The next initializing instruction, "00000045: ret" 822, tells the processor to return to the last "call" instruction and continue executing code from there. This location is popped off the stack.

Since the "call" to the ?square@@YAHH@Z subroutine 809 was made from location 0000000F 816, the computer returns there to continue executing the initializer. The next initializing instruction "00000014: add esp, 4" 823, instructs the computer to ad the two parameters and store the result in the first parameter. So, this instruction is operative to add the number 4 to the stack pointer. Initializing instruction 823 has the same effect as removing the topmost item on the stack, except that the computer does not store a copy of the item that was just removed. The item removed was the number 16 that was put on the stack by the instruction at location 0000000D 815. Initializing instruction "00000017: move [00000000], eax" 824 instructs the computer to copy the eax register (which contains the value 256) into memory at the specified address. No address is listed (it is all zeroes), so the computer must look to the relocation table 806, to determine that address 00000018 803 refers to the variable symbol complexVal@@3HA 654. So the number 256 is copied into complexVal. Initializing instruction "0000001C: pop ebp" 825 restores the value of the ebp register from the copy that was saved by the instruction at location 0000000A 813. Initializing instruction "0000001D: ret" 826 returns the processor to location 00000008 827. Initializing instruction "00000008: pop ebp" 827 again restores the value of the ebp register. Lastly, when initializing instruction "00000009: ret" 828 is executed, a special address that it placed on the stack alerts the present invention that execution of the initializer has been completed.

Turning now to FIG. 9, an exemplary report 900 of the results obtained by performing the exemplary method of present invention on the sample object file is shown. The report 900 indicates that initializer 802, represented by initializer symbol _$E2 702, was successfully pre-processed. As a result of the successful pre-processing, a single constant pre-initialized value of 256 was calculated and assigned to the variable symbol complexVal 654. The initializer 802 was successfully processed because it did not include instructions that were dependent on the state of the system, memory addresses, or symbols external to the object file. As can be seen from exemplary report 900, however, initializer 804, represented by initializer symbol _$E5, was not successfully pre-processed because it included an instruction that referred to the symbol extVal 658 that was external from the object file.

Figure 10:
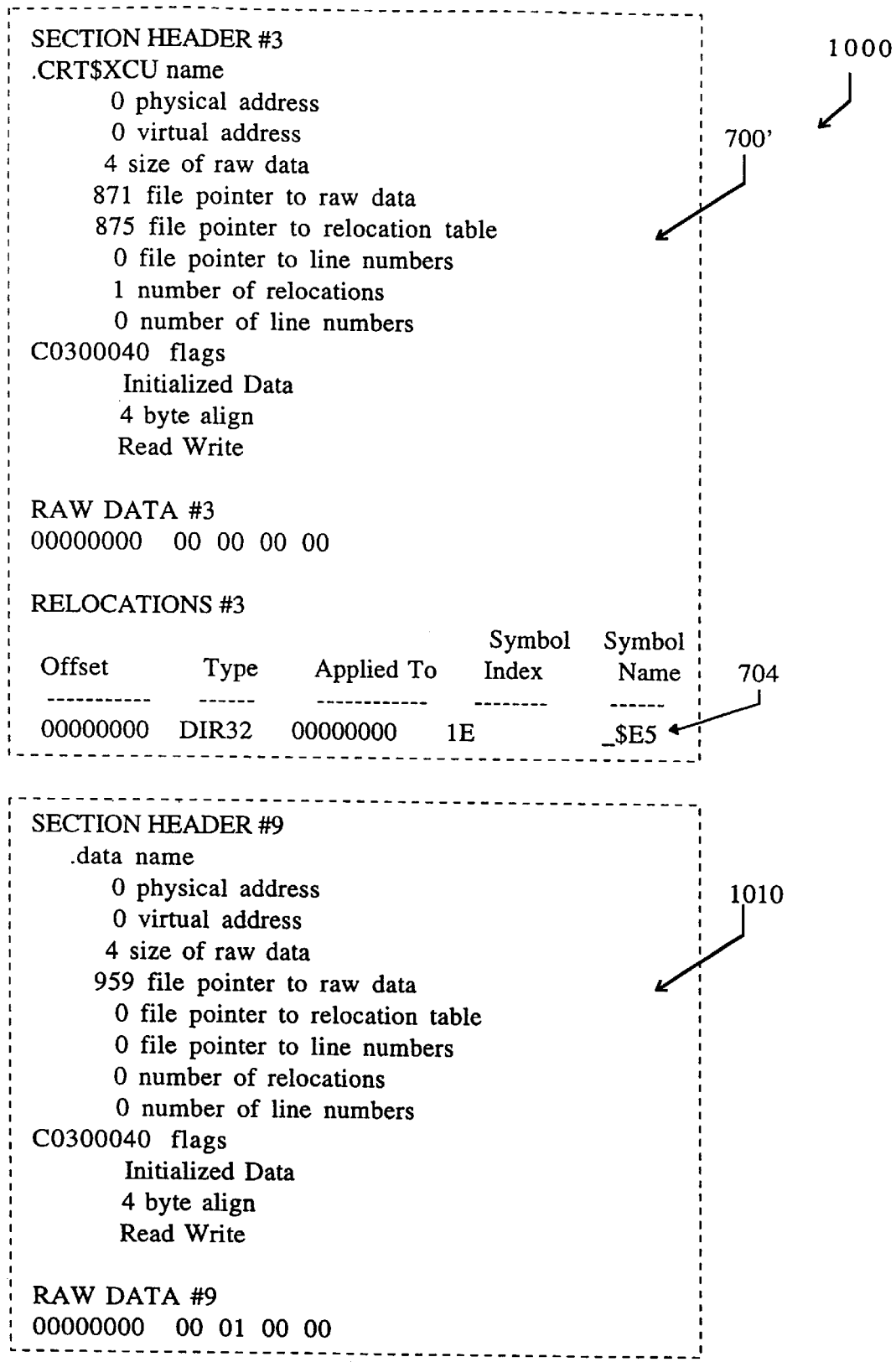
FIG. 10 shows a new Section that is created in an object file to store a pre-initialized value of a variable.

Since initializer 802 was successfully pre-processed, a pre-initialized value for the variable complexVal 502 was determined. This initialized value must be written into the object file so that the initializer 802 may be excluded from the binary image. In order to write the initialized value into the object file, a new section is created. Following the above example, FIG. 10 shows a new Section 9 1010 that was created in the object file to store the initialized value of the variable complexVal 502. The initialized value stored in Section 9 is indecipherable to human inspection, however it is readable to the compiler and linker. To exclude initializer 802 from binary image, the initializer symbol _$E2 702 must be removed from the initializer-list of Section 3 700.

FIG. 10 shows the modified Section 3 700' after the initializer symbol _$E2 702 has been deleted. Note that only initializer symbol _$E5 704 is present in modified Section 3 700'. Initialize symbol _$E5 remains in the initializer-list of modified Section 3 700' because pre-processing of the corresponding initializer 804 was unsuccessful. Thus, initializer 804 must be processed upon start-up of binary image created by linking the object file with other files.

FIG. 11 illustrates the modified symbol table 600' that has been changed to reflect the fact that the initialized value was written into new Section 9 1010 (FIG. 10) of the object file. Reference 1102 indicates that the variable associated with variable symbol complexVal@@3HA 654 is now located in Section 9 1010 (FIG. 10). No other changes to the symbol table are required. When the modified object file is linked with other files to create a binary image, the initialized value for the variable complexVal 502 will be read from Section 9 1010 and written into the binary image. Since the modified Section 3 700' (FIG. 10) contains only the initialize symbol _$E5 704, only initializer 804 (FIG. 8) will be written into the binary image. Therefore, upon start-up of the binary image, only one initializer will be processed. The variable complexVal 502 will have been pre-initialized and the initialize that the compiler created to initialize the variable complexVal 502 will have been excluded from the binary image.

Figure 12:
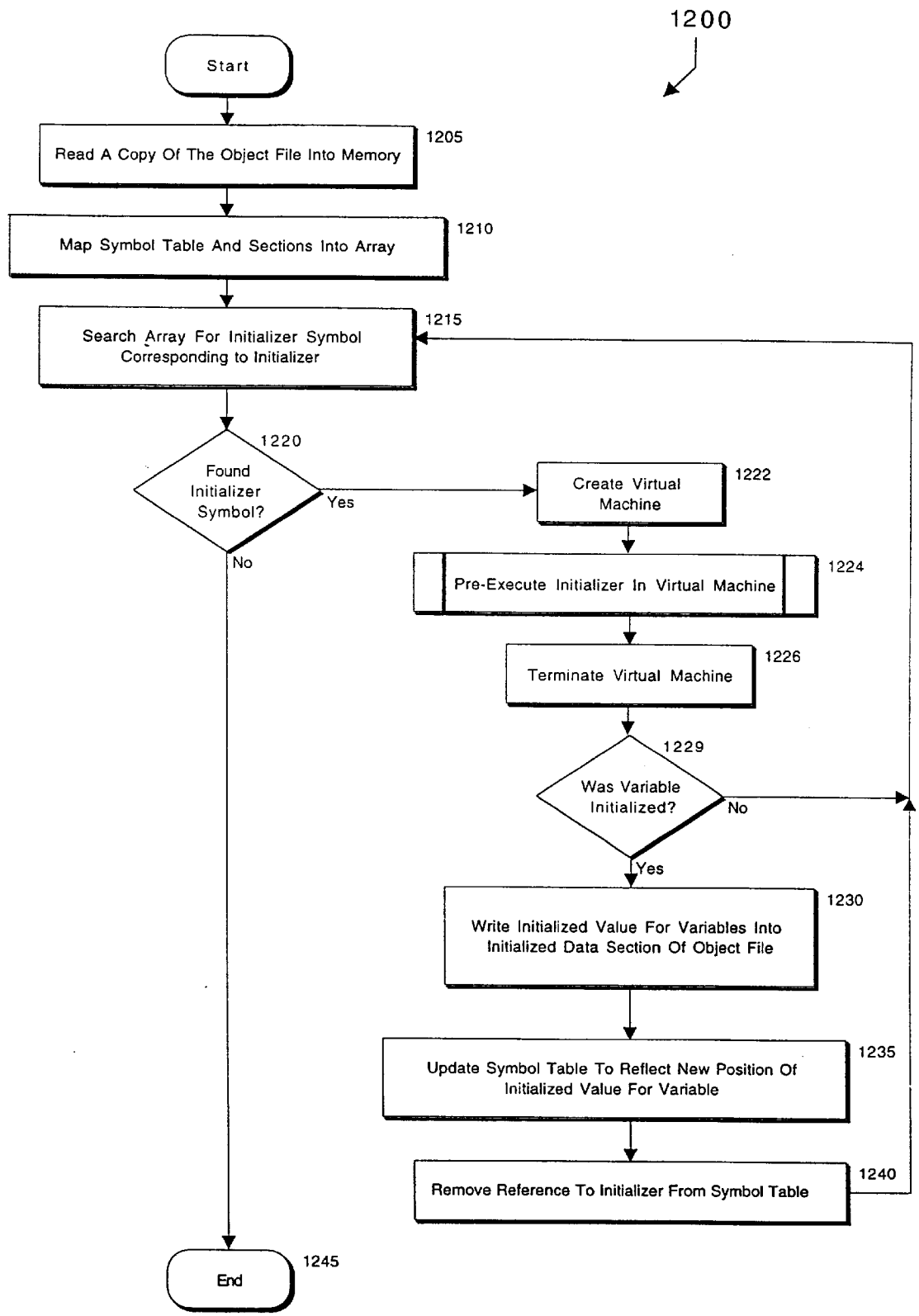
FIG. 12 is a flowchart summarizing the method of the present invention.
Figure 13:
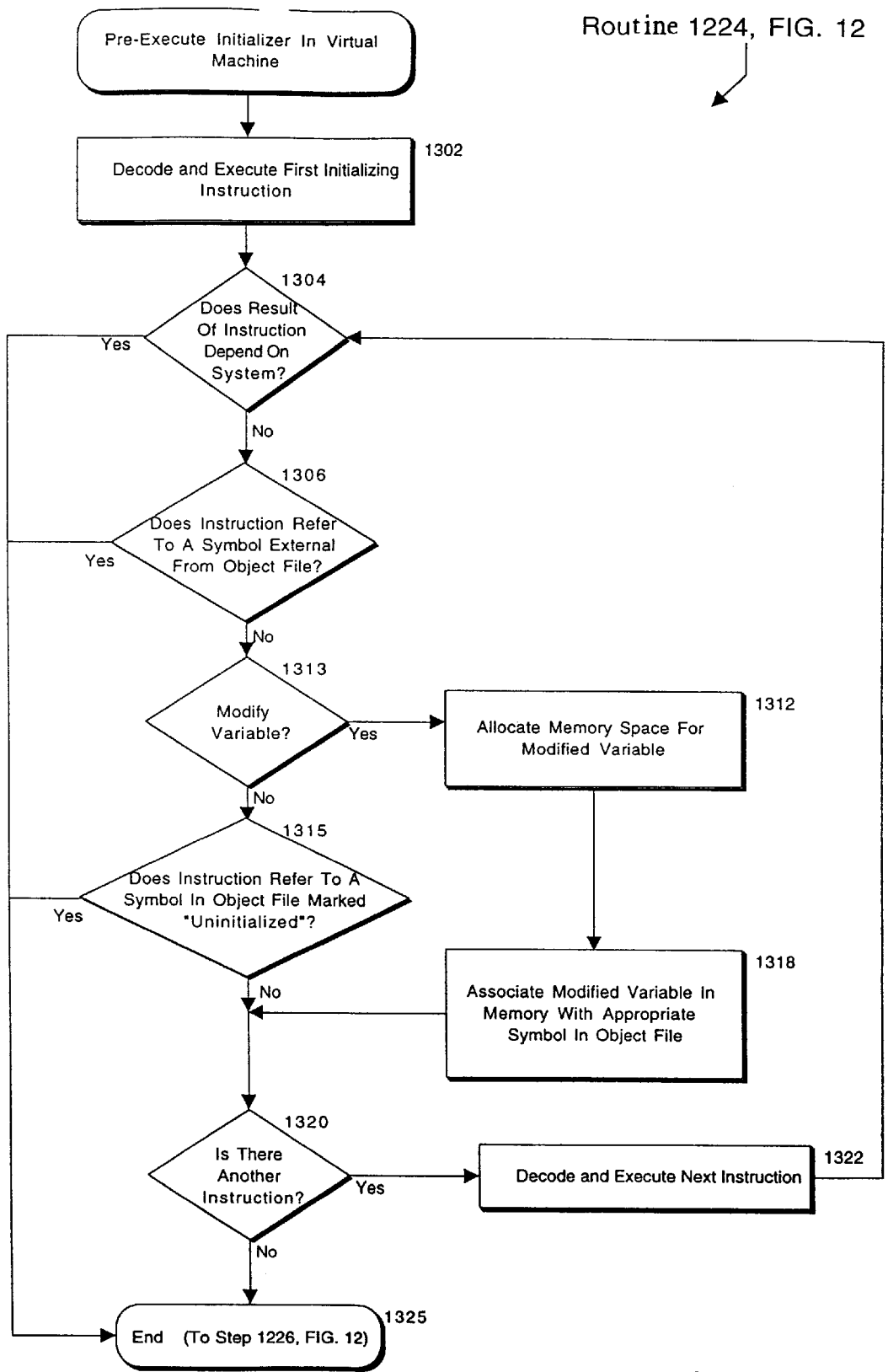
FIG. 13 is a flowchart showing an exemplary method of pre-executing an initializer in a virtual machine.

Flowcharts summarizing the computer-implemented steps of the exemplary method of the present invention, and more particularly pointing out some of the details involved therewith, are shown in FIGS. 12 and 13.

Beginning with FIG. 12, the first step 1205 performed in an exemplary embodiment of the invention is to read a copy of the selected object file into memory. In this way, the exemplary embodiment is able to manipulate the object code without disturbing the original object file until pre-processing of the initializers is complete. Thus, in cases where none of the initializers are successfully pre-processed by the present invention, the copy of the object file is discarded and the original is left untouched. Next, at step 1210, the exemplary embodiment maps the symbol table and all sections of the copied object file into arrays. The arrays are searched at step 1215 to find an initializer symbol corresponding to an initializer. If an initializer symbol is encountered at step 1220, a virtual machine is created at step 1222 for simulating the processing of the initializer. As will be known by those skilled in the art, a virtual machine is software that mimics the performance of a hardware device. An exemplary method of processing an initializer in a virtual machine will be described in detail below with reference to FIG. 13.

Still referring to FIG. 12, after the initializer was pre-processed, successfully or not, in Step 1224, the virtual machine is terminated in step 1226. In step 1229, a determination is made as to whether an initialized value for the variable was determined by processing of the initialize. If no initialized value was determined, meaning that the initializer could not be successfully processed prior to creation of the final version of a binary image, the exemplary method returns to step 1215 to search the arrays for another initializer symbol. However, if an initialized value was determined by successful pre-processing of the initializer, the exemplary method of the present invention proceeds from step 1229 to step 1230, where the initialized value is written into an initialized data section of the object file. The initialized value for the variable is stored in memory as the modified variable. After writing the initialized value into an initialized data section of the object file, the symbol table is updated at step 1235 to reflect the location of the initialized value. Lastly, at step 1240, a reference to the initializer is removed from the object file so that the linker will not be able to incorporate the initialize into the binary image. From step 1240, the exemplary method proceeds to step 1215, to search the arrays for another initializer-symbol. If another initializer is detected at step 1220, another virtual machine is created to decode and execute each instruction of that initializer. This process is continued until all initializers have been pre-processed, either successfully or unsuccessfully. When no other initializer symbols are detected at step 1220, the exemplary method of the present invention is terminated at step 1245.

In the exemplary method described in FIG. 12, the initializers of an object file are described as being processed individually and sequentially, starting with the first initializer encountered in the object file. This is the same order that the initializers would be processed when the binary image is run. The scope of the present invention is not intended to be limited to a method in which initializers are processed sequentially. In an alternate embodiment, it may be desirable to process the initializers in parallel or in a different sequence. However, it is often the case that the initializing instructions of a subsequent initializer will make reference to the variable that is initialized by a previous initializer. Thus, by processing the initializers in sequence, processing of subsequent initializers tends to be more successful.

In FIG. 13, an exemplary method of processing an initializer in a virtual machine is described. The virtual machine attempts to process the initializer, which is comprised of initializing instructions, as if it were processed during the execution of the binary image. The virtual machine processes each initializing instruction of the initializer in sequence. In step 1302, the virtual machine decodes and executes the first initializing instruction of he initializer. In step 1304 a determination is made as to whether the result of the initializing instruction is system dependent, and thus indeterminable. If the result of the initializing instruction is system dependent, the pre-processing of the initializer in the virtual machine is ended at step 1325. If the result of the initializing instruction is not system dependent, the exemplary method continues to step 1306, where a determination is made as to whether the initializing instruction refers to a symbol that is external to the object file. If the initializing instruction does refer to a symbol that is external to the object file, the pre-processing of the initializer in the virtual machine is ended at step 1325. If the result of the initializing instruction does not refer to an external symbol, the exemplary method continues to step 1310, where a determination is made as to whether the initializing instruction requires that the variable be written to, or modified. If the variable does not require modification, the exemplary method moves on to step 1315, where it is determined whether the initializing instruction refers to a symbol located in the object file but marked "uninitialized." In such a case, the value of the symbol will be indeterminable to the virtual machine and the pre-processing of the initializer in the virtual machine will be terminated at step 1325. If however, the initializing instruction does not refer to an uninitialized symbol in the object file, the method proceeds from step 1315 to step 1320, where a search is made for a next initializing instruction.

In order to write to a variable, the exemplary method proceeds from step 1310 to step 1312, where memory space is allocated for the modified variable. Then, in step 1318, the modified variable in memory is associated with the appropriate variable symbol in the symbol table so that the modified variable will be returned when subsequent initializing instructions call that variable symbol.

One particular problem faced by the virtual machine when pre-processing an initializer is that of differentiating between symbols and numerical values when memory addresses are copied. When a variable is referred to, it is referred to by a variable symbol. When the virtual machine then maps the variable symbol into an allocated memory space, as described above, the virtual machine must keep track of the variable symbol and the memory address in which it is stored. In certain situations, the virtual machine may be unable to distinguish between a number stored in a memory register and a symbol stored in a memory register. Thus, those skilled in the art will understand that commonly known programming techniques must be employed to enable the virtual machine to differentiate between number values and symbols. By way of illustration, the exemplary embodiment of the present invention includes a "MappedAddress" structure to enable the virtual machine to differentiate between 32 bit numbers and symbols. The structure substitutes any 32 bit value required by the virtual machine with a MappedAddress. If the mapped pointer is not NULL, then the 32 bit value is actually a pointer to a symbol. In that case, the map field points to the structure allocated for that symbol with information about where it starts, how big it is, and what symbol it refers to. If the mapped pointer is NULL, the address is either an ordinary 32 bit number, i.e., not a memory reference, or it points to one of the virtual machine's internal structures, such as the stack. Those skilled in the art will recognize that other structures of functions may be used to enable the virtual machine to differentiate between numbers and symbols. Therefore, the scope of the present invention is not limited to use of the above-described MappedAddress structure.

The exemplary method then proceeds to step 1320, where a determination is made as to whether there is another initializing instruction. If is another initializing instruction, the exemplary method continues to step 1322, where the next instruction is decoded and executed. Then, the exemplary method returns to step 1304 to repeat the process that was carried out for the first initializing instruction. When in step 1320, it is determined that there are no further initializing instructions, the initializer must have been successfully pre-processed. In that case, the method ends at step 1325.

In summary, the exemplary embodiment of the present invention is operative to pre-initialize a variable prior to the creation of the final version of a binary image. The initializer that is created by a compiler to initialize the variable upon start-up of the executable program is pre-processed in a virtual machine prior to creation of the final version of the binary image and is then excluded from the final binary image code. The initializer is excluded from the final version of the binary image by removing a reference to the initializer from an object file that was created by the compiler. In this way, a linker can determine that an initializer is not being used and does not need to be incorporated into the binary image. Typical compute programs will include a plurality of initializers. The present invention attempts to pre-process each initializer. Those initializers that are successfully pre-processed are excluded from the binary image. Those initializer that are not successfully pre-processed are left undisturbed in the object file, so that they will be linked into the binary image and processed, as intended, upon start-up of the binary image.

The above-described exemplary embodiment has been described with reference to the pre-initialization of variables that are located in object files. Still, those of ordinary skill in the art will understand that variables and initializers therefor may also be included in dynamic link library files and other data files that may be linked into the binary image. It is contemplated that the principles of the present invention for pre-processing an initializer located in an object file may be modified to accomplish the pre-processing of an initializer that may be located in another type of file. Therefore, the scope of the present invention should not be construed as being limited to the pre-processing of initializers located in object files.

Operation of Alternate Embodiments

In a first alternate embodiment, many of the above-described aspects of the exemplary embodiment may be incorporated into the linker program module 112. In such an embodiment, pre-initialization of a variable is performed during the operation of the linker, rather than prior to the operation of the linker. Thus, unlike the above-described exemplary embodiment, there is no need to modify an object file after successful pre-initialization of a variable.

In the first alternate embodiment, all object and/or library files are read by the linker and the pre-processing of all initializers is performed during the linker's operation. So, rather than operating on each object file and/or library file individually, the variable initializers of all such files are pre-processed while the linker processes the data read from the object and/or library files to create a binary image. In this way, more initializers may be successfully pre-processed because a determination as to weather an initializing instruction references an external symbol would be made with respect to all object and/or library files that were read by the linker, rather than a single object file in isolation. The linker may directly modify the data read from the object and/or library files to reflect any pre-initialized variables. Thus, the linker may retain initialized variables in its data structure, while excluding pre-processed initializers therefrom. Then, the linker completes its normal linking operations to produce a binary image having pre-initialized variables.

In another alternate embodiment, certain principles of the present invention may be carried out after object files and library files are linked to form a binary image. This alternate embodiment does not involve the manipulation of object files and does not directly create a binary image having pre-initialized variables. Instead, a typical binary image having initializers is created. The typical binary image is subsequently modified to produce a final version of the binary image having pre-initialized variables.

As mentioned above, initializers must be processed upon each start-up of a typical binary image that does not include pre-initialized variables, because initialized data is not permanently stored in memory. Thus, an alternate method for pre-initializing a variable is to perform an initial start-up of the binary image, which will invoke a call to an initializer. The execution of the initializer will cause a variable to be initialized. The initialized data may then be written into a data structure that may be retained after the initial execution of the binary image is terminated. Specifically, the initialized data may be written in to the program database file (.pdb), the executable file (.exe), dynamic link libraries (.dll) or other data files. The binary image may then be altered in such a way that references are created from the variable to the initialized data in the data structure an calls to the initializer are deleted, or are in some way bypassed. This altered binary image may then be re-saved as a final version of the binary image. Alternatively, the initialized data may be written back into the original object files and/or library files that were linked to form the binary image, as in the exemplary embodiment described above. The object and/or binary files may again be linked to form a final version of the binary image having pre-initialized variables.

The above-described embodiments illustrate that the present invention may be carried out at variable stages: prior to linking, during linking, and subsequent to linking. It should be noted, however, that the above-described embodiments are not intended to be exclusive of each other. It is specifically contemplated that the principles of the present invention may be distributed throughout multiple stages, i.e. performed during more than one stage.

In view of the foregoing, it will be appreciated that the present invention provides a method and system for pre-initializing a variable prior to the creation of the final version of a binary image. Thus, when the end-user invokes the final version of the binary image, no initialization of the variable will occur. As such, a latency in the start-up time of a binary image may be significantly reduced. It should be understood that the foregoing relates only to the exemplary embodiments of the present invention, and that numerous changes may be made thereto without departing from the spirit and scope of the invention as defined by the following claims.

We claim:

1. A method for excluding an initializer from a binary image, the initializer comprising initializing instructions for initializing a variable upon start-up of the binary image, the initializer being part of a file and identified by an initializer symbol, the variable being identified by a variable symbol in the file, the file to be processed by a linker to create the binary image, the method comprising:

in the file, identifying the initialize by way of the initialize symbol;

external to the file, pre-processing the initializer so as to determine an initialized value for the variable;

writing the initialized value for the variable into the file;

in the file, creating a reference from the variable symbol to the initialized value; and in the file, eliminating the initializer symbol, whereby, when the file is processed by the linker to create the binary image, the initializer is excluded and the initialized value for the variable is written directly into the binary image.

2. The method of claim 1, wherein the file comprises a symbol table and a plurality of sections; and wherein identifying an initializer comprises:

searching the symbol table to identify and initializer-list symbol that identifies an initializer-list section, the initializer-list section storing the initializer symbol, in response to identifying the initializer-list section, identifying the initializer symbol in the initializer-list section, in response to locating the initialize symbol, searching the symbol table to identify an initializer section, the initializer section storing the initializer, and in response to identifying the initializer section, locating the initializer, the initializer being a segment of initializer code for initializing the variable.

3. The method of claim 2 wherein writing the initialized value into the file comprises:

creating an initialized data section in the file; and writing the initialized value into the initialized data section.

4. The method of claim 2, wherein eliminating the initializer symbol comprises:

searching the symbol table to identify the initializer-list symbol that identifies the initializer-list section, the initializer-list section storing the initializer symbol; and in response to identifying the initializer-list section, eliminating the initializer symbol from the initializer-list section.

5. The method of claim 1, wherein pre-processing the initializer so as to determine the initialized value for the variable comprises:

creating a virtual machine; and in the virtual machine, processing the initializer as if it were being processed during execution of the binary image.

6. The method of claim 5, wherein processing the initializer as if it were being processed during execution of the binary image comprises:

sequentially loading and executing each initializing instruction by:

determining that the initializing instruction is not system dependent, determining that the initializing instruction does not refer to a symbol external to the file, determining that the variable is modified by execution of the instruction, and in response to determining that the variable is modified by the execution of the initializing instruction, storing the modified variable in memory; and when the last initializing instruction is executed treating the modified variable as the initialized value.

7. A computer-readable medium having stored thereon computer-executable instructions for performing the method of claim 1.

8. A method for excluding an initializer from a binary image prior to creation of the binary image, the initialize being stored in a file and comprising initializing instructions for initializing a variable upon start-up of the binary image, the file also storing a symbol table which stores an initializer-list symbol identifying an initializer-list, an initializer symbol identifying the initializer, and a variable symbol identifying an uninitialized value for the variable, the method comprising:

determining an initialized value for the variable by executing each initializing instruction of an initializer;

storing the initialized value in the file;

in the symbol table, identifying the initializer-list symbol that identifies the initializer-list;

in response to identifying the initializer-list, removing the initializer symbol from the initializer list; and in the symbol table, causing the variable symbol to identify the initialized value rather than the uninitialized value, whereby, when the binary image is created from the file, the variable is already initialized and the initializer is excluded from the binary image.

9. The method of claim 8, wherein determining the initialized value for the variable by executing each initializing instruction of the initializer comprises:

for each initializing instruction:

determining that the initializing instruction is not system dependent, determining that the initializing instruction does not refer to a symbol external to the file, determining whether the variable is modified by execution of the instruction, and in response to determining that the variable is modified by the execution of the initializing instruction, storing the modified variable in memory; and when the last initializing instruction is executed treating the modified variable as the initialized value.

10. The method of claim 9, further comprising in response to determining that the variable is not modified by the execution of the initializing instruction determining that the initializing instruction does not refer to an uninitialized symbol in the file.

11. A computer-readable medium having stored thereon computer-executable instructions for performing the method of claim 8.

12. A computer system configured for creating a binary image including a pre-initialized variable comprising:

a memory;

a file residing in the memory, the file storing an initializer comprising initializing instructions for initializing a variable;

a processing unit coupled to the memory for:

initializing the variable by pre-processing the initializer, writing the initialized variable into the file, eliminating a reference from the variable to the initializer from the file, and adding to the file a new reference from the variable to the initialized value; and a linker, coupled to the processing unit, for processing the file to create a binary image after the reference to the initializer is eliminated from the file and after the new reference is added to the file, such that the initializer is excluded from and the initialized value for the variable is written into the binary image.

13. A computer readable medium having stored thereon a binary image containing a pre-initialized variable created by a method of comprising:

in a file, identifying an initializer for initializing a variable;

external to the file, preprocessing the initializer so as to determine an initialized value for the variable;

writing the initialized value for the variable into the file;

in the file, replacing a reference from the variable to the initializer with a new reference from the variable to the initialized value; and processing the file with a linker after replacing the reference, so as to create the binary image wherein the initializer is excluded from and the initialized value is written into the binary image.

14. A method for excluding an initializer from a binary image, the initializer comprising initializing instructions for initializing a variable upon start-up of the binary image, the initialize being stored in a file and identified by an initializer symbol, data from the file to be processed by a linker to create the binary image, the method comprising:

the linker reading the data from the file;

the linker identifying the initializer by way of the initialize symbol;

the linker pre-processing the initialize so as to determine an initialized value for the variable;

the linker retaining the initialized value for the variable in a data structure;

the linker excluding the initializer from the data read from the file; and the linker processing the data read from the file and the data structure to create the binary image.

15. A computer-readable medium having stored thereon computer-executable instructions for performing the method of claim 14.

16. A method for excluding an initializer from a final version of a binary image, the initializer being a function for initializing a variable, the method comprising the computer implemented steps of:

starting-up a binary image, start-up of the binary image invoking a call to the initializer to determine an initialized value for the variable;

after the initialized value is determined, storing the initialized value in a data structure; and creating a final version of the binary image in which the call to the initializer in the binary image is replaced with a reference from the variable to the initialized value stored in the data structure so as to exclude the initializer from being called during execution of the final version of the binary image.

17. A computer-readable medium having stored thereon computer-executable instructions for performing the method of claim 16.

18. A computer system configured for excluding an initialize from a binary image comprising:

a memory;

a file residing in the memory and storing an initializer, the initializer identified by a reference and comprising initializing instructions for initializing a variable;

a processing unit, coupled to the memory, for:

pre-processing the initializing instructions of the initializer in order to determine an initialized value for the variable, writing the initialized value for the variable into the file, eliminating the reference to the initializer from the file, and adding to the file a new reference from the variable to the initialized value; and a linker, coupled to the processing unit, for processing the file to create a binary image after the reference to the initializer is eliminated from the file and after the new reference is added to the file, such that the initialize is excluded from and the initialized value for the variable is written directly into the binary image.

* * * * *